__Patented Oct. 31, 1944__

2,361,505

UNITED STATES PATENT OFFICE

2,361,505

PRINTING INK AND METHOD OF PRODUCING

Edward Sheridan, Bronx, N. Y., assignor to Interchemical Corporation, New York, N. Y., a corporation of Ohio No Drawing. Application March 17, 1941, Serial No. 383,796

7 Claims. (Cl. 106—20)

This invention relates to pigmented compositions such as typographic printing inks, comprising alkali metal silicate solutions and pigments which form gel structures with them, and has particular reference to the production of usable compositions from gels of pigment and alkali silicate solutions.

Alkali silicates have been suggested as vehicles for various sorts of printing inks, but have never been used extensively for a variety of reasons. One important objection has been the inability of the formulator to use the common cheap pigments available for use with customary vehicles, because of the fact that the pigments form gels or precipitates when dispersed in the alkali silicate vehicles. This phenomenon is observable with the chrome yellows and greens, iron blues, alkali blue, magnesium carbonate, alumina hydrate, organic lakes made from acid and basic dyestuffs, and other pigments. Since the silicates are particularly useful only in specialty printing, where bright, cheap, attractive colors are essential, the necessity for using high priced colors has practically eliminated silicates as ink vehicles from most fields, limiting them to the relatively few situations where the high pigment cost is not an insuperable objection to their use.

I have discovered that pigments which gel with silicate solutions may be made into usable inks and the like by gelling a mixture of the pigment, a silicate solution and glycerin, and redispersing the gel in a medium substantially free of untreated silicate.

The resultant product appears to be a dispersion of the gel in the new medium. These dispersions gel with untreated silicate solutions, in similar fashion to the untreated pigments; but the redispersed gels are miscible with one another in all proportions, and can be reduced as desired with other miscible media.

My invention is particularly useful with inks containing high percentages of glycerin, such as are disclosed in the co-pending application of Albert E. Gessler, Serial Number 305,452, filed November 21, 1939, which contain more than 50% polyhydric alcohol. However, the invention is extremely useful for other types of inks, since the amount of glycerin needed to produce a dispersible gel is rather small, only about 5% being necessary in any given composition.

I prefer to use alkali silicates of minimum alkali content, since these silicates are less apt to affect the shade of many pigments than the more alkaline silicates. For the same reason, I prefer to add buffering agents to reduce the pH; such agents include boric acid, citric acid and similar weak acids.

Because the gelling action of many of the pigments on silicate solutions is rather slow, I find it desirable at times to increase the gelation rate by heat, by the use of acid (which is preferably an acid usable for its buffering action), by increasing pigment concentration, or by adding a colorless rapidly gelling inert such as alumina hydrate.

Where a mixture of gelling pigment with non-gelling pigment is required to attain a particular color, the two may be mixed and gelled together; or the non-gelling pigment may be mixed with alumina hydrate and made into a gelled and redispersed ink which is miscible with the system.

Typical examples of my invention are the following:

EXAMPLE 1

Intaglio ink

| | Parts by weight |
|---|---|
| Iron blue | 10 |
| Sodium silicate solution (3.9 $SiO_2 \cdot Na_2O$—31% solids) | 80 |
| Glycerin | 10 | are mixed thoroughly in a dough mixer; in ½ hour or less a gel is formed. The gel is then redispersed in 10% or more of its weight of water in a pebble mill; the resultant short, buttery ink may be printed by the intaglio process.

EXAMPLE 2

Typographic varnish

To—

| | |
|---|---|
| Sodium silicate solution of Example 1 grams | 64.5 | add—

| | |
|---|---|
| C. P. glycerin (95%), with stirring do | 74.0 |

Remove from above mixture by vacuum—

| | |
|---|---|
| Water cc | 38.5 |

The resultant varnish has the following composition:

| | |
|---|---|
| Sodium silicate | 20.0 |
| Glycerin (95%) | 74.0 |
| Water | 6.0 |

EXAMPLE 3

Iron blue typographic ink

| | Parts by weight |
|---|---|
| Iron blue | 35 |
| Varnish of Example 2 | 35 | are mixed in a dough mixer; in ½ hour or less a gel is formed. This is allowed to mix for two hours, and then there is added to the dough mixer:

| | |
|---|---|
| Boric acid | 5 |
| Glycerin | 23 |
| Santomerse D (alkyl-aryl sulfonate) | 2 |

The mass is mixed, and passed over a conventional three-roll mill.

The surface active agent, "Santomerse D," is useful in reducing the dispersion time, and the boric acid acts to buffer the action of the alkali on the normally sensitive iron blue.

EXAMPLE 4
Chrome yellow

| | Parts by weight |
|---|---|
| Primrose chrome yellow | 55 |
| Varnish of Example 2 | 25 | are gelled in a dough mixer, and finished as in Example 3, after adding—

| | |
|---|---|
| Glycerin | 20 |

EXAMPLE 5
Lithol red

| | Parts by weight |
|---|---|
| Calcium lithol toner | 30 |
| Varnish of Example 2 | 30 |
| Boric acid (to accelerate gelation) | 5 | are gelled as in Example 3, and finished on a three-roll mill, after adding—

| | |
|---|---|
| Glycerin | 33 |
| Vultamol (aromatic ester sulfonate) | 2 |

EXAMPLE 6
Typo ink

A typographic ink can be made directly by my process, utilizing ordinary aqueous silicates. Thus—

| | Parts by weight |
|---|---|
| Sodium silicate solution of Example 1 | 32.25 |
| 95% glycerin | 37.00 |
| Iron blue pulp, containing 35% pigment | 100.00 | are placed in a steam-jacketed, vacuum-equipped dough mixer, and allowed to mix for thirty minutes, to form a gel. There were then added—

| | |
|---|---|
| Boric acid | 5.00 |
| Santomerse D | 2.00 |
| 95% glycerin | 11.00 |

Water was then distilled from the mass by vacuum, until 86 parts by weight were removed. The finished ink was removed from the mix; it was similar to that of Example 3.

EXAMPLE 7
Chrome yellow from silicate "glass"

| | Parts by weight |
|---|---|
| Chrome yellow | 54.0 |
| Silicate powder ($2SiO_2 \cdot 1NaO_2$—10–15% water) | 3.8 |
| Water | 2.0 |
| Glycerin | 40.2 |

The silicate powder and water, and from 5 to 10% of the glycerin are mixed in a dough mixer until solution takes place. At this point the pigment and a portion of the glycerin are added proportionately, keeping the mass stiff. After these ingredients are added, gelation of the mass takes place. After mixing about 15 minutes, redispersion takes place, and the remainder of the materials are added.

EXAMPLE 8
Iron blue

| | Parts by weight |
|---|---|
| Iron blue | 25.0 |
| Silicate powder of Example 7 | 9.0 |
| Water | 3.7 |
| Boric acid | 4.2 |
| Santomerse D | 1.6 |
| Glycerin | 56.5 |

The silicate powder and water and about 20 parts of glycerin are mixed in a dough mixer until solution takes place (15 minutes). At this point the pigment and part of the remaining glycerin are added proportionately, keeping the mass stiff. After these ingredients are added, gelation takes place. After mixing about 15 minutes, redispersion takes place, and the remainder of the materials are added.

"Anhydrous" powders (still containing 2 to 3% water) may be utilized in the same manner as the powder of Example 7, which is spray-dried.

The examples can of course be multiplied indefinitely without departing from the scope of the invention, which is defined in the claims.

The silicate used for the purpose may be any soluble alkali silicate; best results are obtained with soluble silicates having ratios of silica to alkali oxide of from about 3.2 to 1.0 up, the least alkaline of the commercially available silicate (ratio 3.9 to 1.0) being most satisfactory. Soluble silicates of higher ratios may be used, but cannot be obtained readily. Potassium silicates are also useful, although more expensive. Silicates of ratios below 3.2 to 1.0 tend to dry more slowly, and their extreme alkalinity causes difficulties with alkali-sensitive pigments.

By buffering with a weak acid, however, as in Example 8, even the more alkaline silicates can be used with alkali-sensitive pigments. These buffering agents are useful to prevent unlaking of lake pigments, and to prevent the formation of sodium lithols from the calcium and barium salts. They also help in accelerating the gelation of pigments which otherwise cannot be gelled.

Glycerin appears to be unique in its effect, in producing a dispersible gel with silicates and gelling pigments. Other miscible solvents (glycols, alcohol ethers such as the "cellosolves" and "carbitols," etc.) can of course be added to the compositions, provided they do not adversely affect the properties of the ink.

Any pigments may be used in the practice of my invention, in the absence of a chemical effect on the pigment by the silicate solution. Non-gelling pigments must of course be combined with ingredients which cause gelation of the vehicle.

While the disclosed compositions are particularly useful as printing inks, my method of utilizing pigments which gel with silicates may obviously be applied to other pigmented silicate compositions, such as paints and the like.

I claim:

1. A composition comprising a gel of pigment, glycerin and water-soluble alkali silicate uniformly dispersed through a water-miscible vehicle substantially free of silicate which has not been gelled, the composition containing at least about 5% glycerin.

2. A printing ink stable on a typographic press, comprising a gel of pigment, glycerin and water-soluble alkali silicate uniformly dispersed through a water miscible vehicle substantially free of silicate which has not been gelled, the composition containing at least about 50% glycerin.

3. A composition comprising a gel of pigment, glycerin and water-soluble sodium silicate having a silica-sodium oxide ratio of at least about 3.2 to 1.0 uniformly dispersed through a water-miscible vehicle substantially free of silicate which has not been gelled, the composition containing at least about 5% glycerin.

4. A printing ink stable on a typographic press, comprising a gel of pigment, glycerin and water-soluble sodium silicate having a silica-sodium oxide ratio of at least about 3.2 to 1.0 uniformly dispersed through a water-miscible vehicle substantially free of silicate which has not been gelled, the composition containing at least about 50% glycerin.

5. The method of making a composition which comprises gelling a mixture of pigment, alkali silicate solution and at least about 5% glycerin, and dispersing the gel in a water miscible vehicle free of silicate which has not been gelled.

6. The method of making a printing ink comprising gelling a mixture of pigment, aqueous alkali silicate solution in the presence of at least about 5% glycerin, adding glycerin, and removing water from the mixture while dispersing the gel to produce a dispersion of the gel in glycerin containing at least about 50% glycerin.

7. The method of making a printing ink comprising gelling a mixture of pigment and aqueous alkali silicate solution in the presence of at least about 5% glycerin, adding a water-miscible vehicle free of ungelled silicate, and dispersing the gel.

EDWARD SHERIDAN.